United States Patent [19]

Mori et al.

[11] 4,099,684
[45] Jul. 11, 1978

[54] SEAT BELT SYSTEM

[75] Inventors: Mamoru Mori, Okazaki; Jun Yasumatsu, Toyota; Tatsushi Kubota, Okazaki, all of Japan

[73] Assignees: Toyota Jidosha Kogyo Kabushiki Kaisha; K. K. Tokai Rika Denki Seisakusho, both of Japan

[21] Appl. No.: 818,415

[22] Filed: Jul. 25, 1977

[30] Foreign Application Priority Data

Aug. 2, 1976 [JP] Japan .......................... 51-103419[U]

[51] Int. Cl.$^2$ ........................ A62B 35/02; B65H 75/48
[52] U.S. Cl. ............................ 242/107; 242/107.4 R; 280/747; 297/388
[58] Field of Search ............................ 242/107–107.7; 297/388; 280/744–747

[56] References Cited

U.S. PATENT DOCUMENTS 4,065,156   12/1977   Tanaka et al. ...................... 297/388

Primary Examiner—Harvey C. Hornsby
Assistant Examiner—John M. Jillions
Attorney, Agent, or Firm—Koda and Androlia

[57] ABSTRACT

A seat belt retractor system of the type wherein two seat belts are wound up on a single retractor shaft one over the other. The retractor includes a base, a retractor shaft rotatably supported by the base and a fastening means provided on both seat belts whereby the seat belts are easily fastened together when the seat belts contact each other during retraction and are easily separated when the seat belts are separated during extension.

8 Claims, 5 Drawing Figures

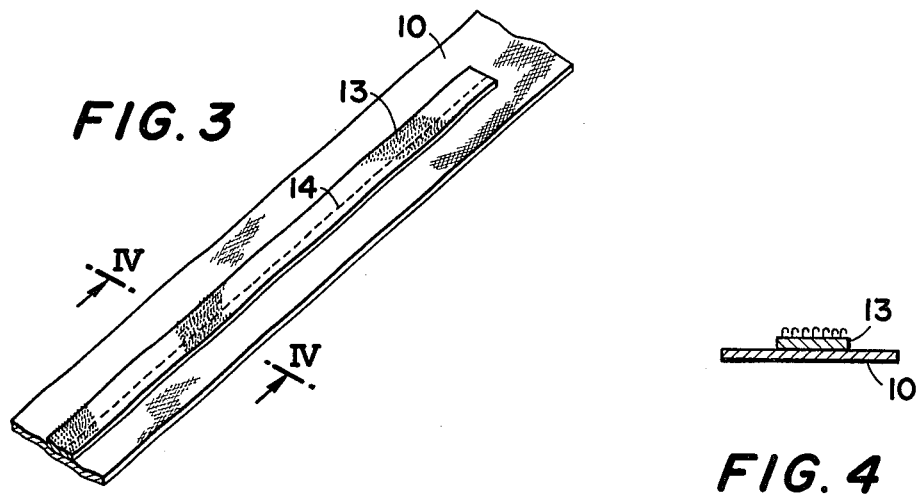
FIG. 3
FIG. 4
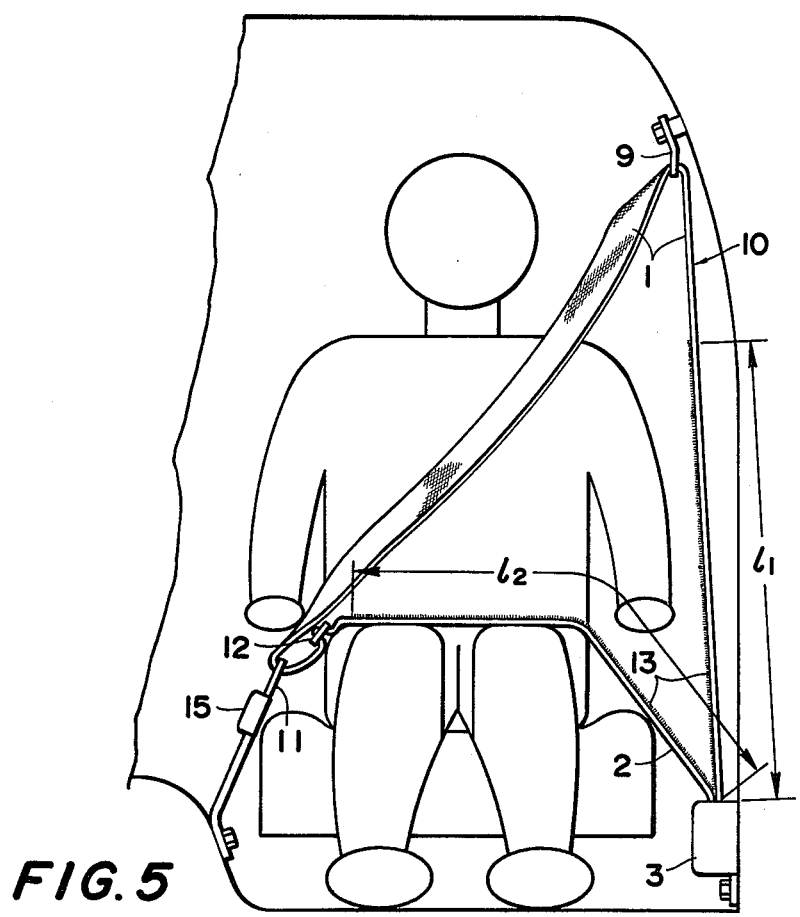
FIG. 5

SEAT BELT SYSTEM

BACKGROUND OF THE INVENTION

1. Field of the Invention

This invention relates to seat belt systems and more particularly to seat belt systems using a retractor which is winding up two seat belts on a single retractor shaft one over the other.

2. Prior Art

In conventional seat belt systems in which two restraining belts are wound up on a single retractor shaft one over the other, when only one belt (i.e., the shoulder restraining belt) is pulled out, the remaining lap restraining belt is extended in the same manner. However, since no pulling force is applied to the lap restraining belt, this belt sometimes becomes slack inside the retractor mechanism (as indicated by the broken line A in FIG. 1). When a restraining belt becomes slack inside the retractor case mechanism, there is a danger that this slackened restraining belt will become stuck between the retractor shaft and the case of the retractor mechanism so that extension becomes impossible. Furthermore, there is a danger that this slackened restraining belt will interfere with the operation of the emergency locking retractor mechanism. In addition to these drawbacks, there is the further drawback that if the passenger is not careful while using the system, slack of the restraining belt will sometimes be generated so that it is not sufficient to restrain the passenger and this restraining condition is extremely dangerous.

This invention has been designed to eliminate these conventional technological defects.

SUMMARY OF THE INVENTION

Accordingly, it is a general object of the present invention to provide a seat belt system in which when one of the restraining belts is pulled out the other restraining belt will also be smoothly extended without becoming slack inside the retractor case.

It is yet another object of the present invention to provide in a seat belt system a retractor for winding up two seat belts on a single retractor shaft one over the other which is simple, easy to manufacture and low in cost.

In keeping with the principles of the present invention, the objects are accomplished by a unique seat belt retractor system of the type wherein two seat belts are wound up on a single retractor shaft one over the other. The retractor includes a base, a retractor shaft rotatably supported by the base and a fastening means provided on both seat belts whereby the seat belts are easily fastened together when the seat belts contact each other during retraction and are easily separated when the seat belts are separated during extension. Therefore, when one of the two seat belts is pulled out of the retractor, the other seat belt will also be smoothly extended without becoming slack inside the retractor case.

BRIEF DESCRIPTION OF THE DRAWINGS

The above mentioned and other features and objects of the present invention will become more apparent by reference to the following description taken in conjunction with the accompanying drawings wherein like reference numerals denote like elements, and in which:

FIG. 3 is an oblique view which illustrates the essential features of one example of a velveting fastener attachment means;

FIG. 4 is a cross-sectional view along the line IV—IV in FIG. 3; and

FIG. 5 is a front view of the embodiment of FIG. 1 showing the seat belt system in use.

DESCRIPTION OF THE INVENTION

Figure 1:
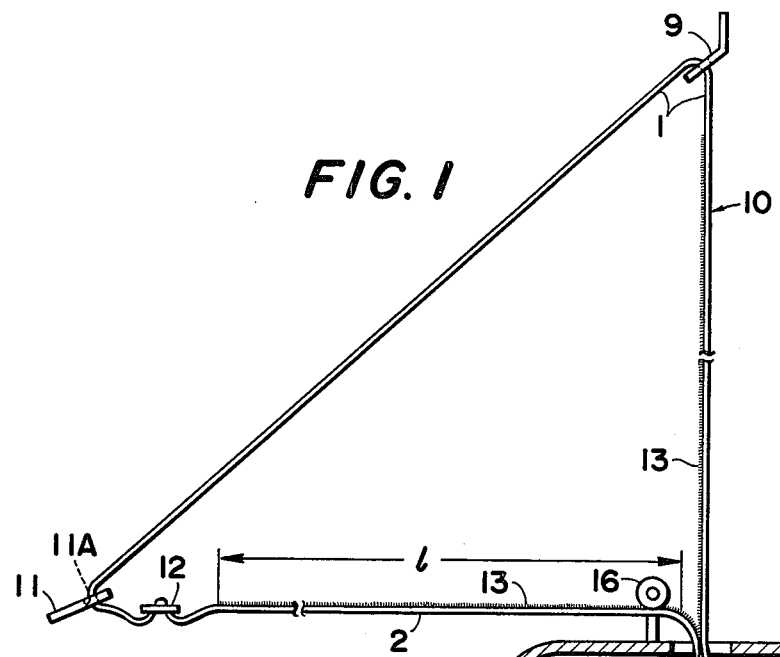
FIG. 1 is a cross-section of one embodiment of a seat belt system in accordance with the teachings of the present invention in which the essential parts have been magnified.

Referring more particularly to the drawings, shown in FIG. 1 is a seat belt system in accordance with the teachings of the present invention. In FIG. 1 the seat belt system includes a shoulder restraining belt 1 and a lap restraining belt 2. The shoulder restraining belt 1 and the lap restraining belt 2 are both parts of a single loop or endless webbing which forms a continuous restraining belt 10. A portion of restraining belt 10 is fastened to a single retractor shaft 4 of retractor mechanism 3. The retractor shaft 4 is powered in the direction of retraction by a spring (not shown) and a ratchet wheel 5 is fixed thereto. A paw 6, which is operated by an emergency locking retractor mechanism, is provided in the vicinity of ratchet wheel 5 so that it can engage with the ratchet wheel 5. Furthermore, the retracted ends of restraining belt 10 pass from the retractor shaft 4 through an opening 7A in sleeve 7 (which is roughly C shaped in cross-section) and is wrapped aroung the circumference of sleeve 7. Restraining belt 10 then extends into the interior of the vehicle through restraining belt extension opening 8 in the retractor mechanism 3. At the point where restraining belt 10 extends through extension opening 8, the restraining belt 10 branches out to form shoulder restraining belt 1 and lap restraining belt 2 which are extended so that they restrain the passenger. More precisely, the shoulder restraining belt 1 is extended vertically upwardly and passes through an eye in an anchor 9. Shoulder restraining belt 1 further extends and passes through a restraining belt passage 11A in tongue plate 11. The shoulder restraining belt 1 further extends through the tongue plate stopper 12 where lap restraining belt 2 begins.

Figure 2:
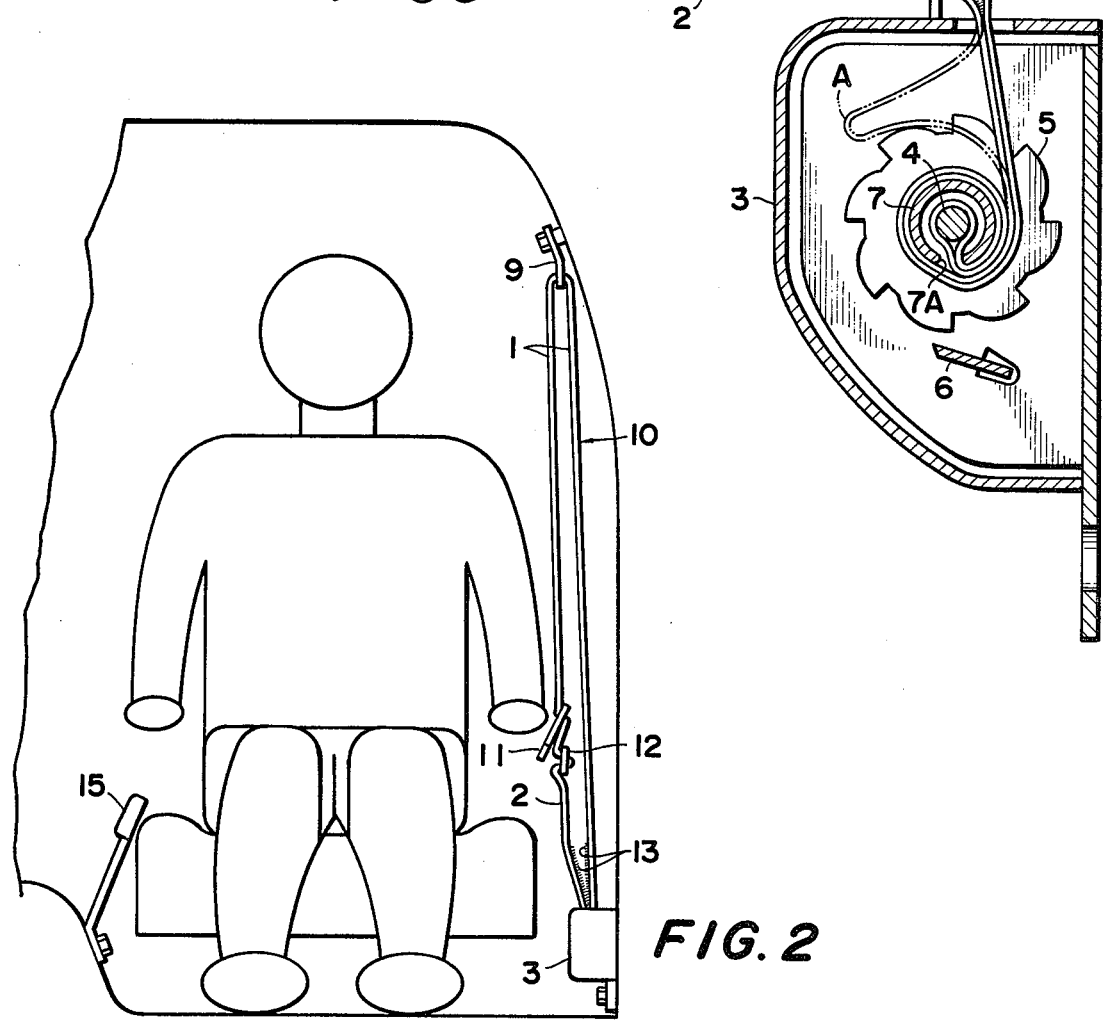
FIG. 2 is a front view of the embodiment of FIG. 1 when the seat belt is not in use.

Furthermore, a male half of a "velveting fastener" 13 is attached to the shoulder restraining belt 1 and the female half of a velveting fastener 13 which is known, for instance, as "Velcro fastener" or "magic fastener" manufactured by Velcro Company in Switzerland is attached to the surface of lap restraining belt 2 which faces a male half of a "velveting fastner" of the shoulder restraining belt 1. Specifically, the velveting fastener 13 is attached to a portion of the restraining belt 10 which extends from the retractor shaft 4 to the part of the belt that projects slightly into the interior of the vehicle from the retractor case 3 when the system is not in use; i.e., when the restraining belt 10 is partially stored inside the retractor case 3 (as shown in FIG. 2). Buckle 15 engages with tongue plate 11 when the seat belt system is utilized.

The attachment of the velveting fastener 13 to the restraining belt 10 is illustrated in FIGS. 3 and 4. In FIGS. 3 and 4, the velveting fastener 13 is sewn to the restraining belt 10 with a length of thread 14. It should be evident to one skilled in the art, however, that the velveting fastener 13 does not necessarily have to be sewn to the restraining belt 10 in this manner; there are any number of other methods that would also be acceptable.

In operation, since the velveting fastener 13 is attached to the portion of the restraining belt 10 which extends from the retractor shaft 4 to a point which is slightly beyond the restraining belt extension opening 8 when the restraining belt 10 is not in use, the lap restraining belt 2 which is fastened to the shoulder restraining belt 1 is extended together with shoulder restraining belt 1 when shoulder restraining belt 1 is pulled out. Accordingly, there will be no slackening of lap restraining belt 2 inside the retractor case 3. It should be apparent that the seat belt system would operate in the same way if only the lap restraining belt 2 is pulled out.

As the restraining belt 10 is extended beyond the restraining belt extension opening 8, a separating force is applied to both restraining belts 1 and 2 due to the fact that the lap restraining belt is extended in a horizontal direction and the shoulder restraining belt is extended in a vertical direction. Accordingly, the two restraining belts 1 and 2 are separated as the fastening force of the velveting fastener 13 is overcome and are extended in different directions. Here, the extension of the restraining belt 10 is made even smoother by a roller 16 which is attached to the retractor cover. Furthermore, when the restraining belt 10 is retracted, the retractor shaft 4 is caused to rotate in the direction of retraction by the force of the spring so that the restraining belt 10 is readily retracted by the retracting shaft 4 and both restraining belts 1 and 2 are fastened together again inside the retractor case 3.

The velveting fastener 13 is of the type which is fastened together merely by causing the two halves to contact each other and can be easily separated by the application of a force in separate directions. However, any other means which possesses such a property could be attached to restraining belts 1 and 2 instead. Accordingly, this invention is not necessrily limited to the use of a velveting fastener 13.

Referring to FIG. 5, shown therein is the restraining belt 10 when it is in use. In this situation, since the shoulder restraining belt 1 and the lap restraining belt 2 are both extended by approximately the same amount, the tongue plate 11 and the velveting fastener 13 does not interfere with each other. Specifically, the length $L_1$ of the velveting fastener on the shoulder restraining belt 1 and the length $L_2$ of the velveting fastener on the lap restraining belt 2 are approximately equal. Accordingly, there will be no damage to the velveting fastener 13 and no increase in friction nor loss caused by the restraining belt 10 being folded back at the tongue plate 11.

In the above described embodiment, the velveting fastener 13 was described as being attached in a continuous strip which extended along the rolled up restraining belt 10 all the way to the vicinity of the retractor shaft 4. However, it should be apparent that other arrangements are possible. In particular, the velveting fastener 13 could also be attached intermittently. As for the position of such attachment, the velveting fastener 13 can be attached anywhere up to the portion of the restraining belt 10 which immediately precedes the tongue plate 11 when the tongue plate 11 has been inserted into the buckle 5 after the restraining belt 10 has been extended, i.e., the portion indicated by "P" in FIG. 1. If the velveting fastener is thus attached intermittently, there will sometimes be slack in the restraining belt when the restraining belt 10 is not in use. However, if the passenger first pulls out only the shoulder restraining belt 1 and then switches his grip to the tongue plate 11 in order to buckle up, the belt will be retracted by the force on the retractor shaft 4 so that the slack is eliminated when the restraining belt 10 are in use.

As described above, in this invention both restraining belts are extended together even if only one of the restraining belts is pulled out. Accordingly, the generation of slack in the restraining belts inside the retractor case is prevented. In addition, this invention has the superior effect of substantially eliminating any danger of the passenger caused by insufficient restraining.

In all cases it is understood that the above described embodiment is merely illustrative of but one of the many possible specific embodiments which can represent the applications of the principles of the present invention. Numerous and varied other arrangements can be readily devised by those skilled in the art utilizing these principles without departing from the spirit and scope of the invention.

We claim:

1. A seat belt retractor system for winding up two seat belts on a single retractor shaft one over the other, comprising:
    a base;
    a retractor shaft rotatably supported by said base two seat belts coupled said retractor shaft; and
    a flexible fastening means provided on both of said seat belts whereby said seat belts are easily fastened together along their length when the seat belts contact each other during retraction and are easily separated when the seat belts are separated during extension.

2. A seat belt retractor system according claim 1 wherein said seat belts are formed from one continuous belt.

3. A seat belt retractor system according to claim 1 wherein said fastening means is provided intermittently along the length of both of said seat belts.

4. A seat belt retractor system according to claim 1 wherein said fastening means is provided intermittently along the length of both of said seat belts.

5. A seat belt retractor system according to claim 1 wherein said fastening means is provided intermittently along the length of one of said seat belts, and continuously along the length of the other of said seat belts.

6. A seat belt retractor system according to claim 3, 4 and 5 wherein said fastening means is a "velveting fastener."

7. A seat belt retractor system according to claim 1 further comprising:
    a roller attached to a retractor cover; and
    one of said seat belts passes over said roller and the other of said seat belts passes between said roller and said retractor cover.

8. A seat belt retractor system for winding up two seat belts on a single retractor shaft one over the other comprising:
    a base;
    a retractor shaft rotatably supported by said base;
    two seat belts coupled to said retractor shaft, are formed as one continuous belt;
    a flexible fastening means provided on both of said seat belts whereby said seat belts are easily fastened together along their length when the seat belts contact each other during retraction and are easily separated when the seat belts are separated during extension; and
    a roller attached to said base whereby said seat belts are smoothly separated during extension.

* * * * *